(12) United States Patent
Lee et al.

(10) Patent No.: US 7,716,813 B2
(45) Date of Patent: May 18, 2010

(54) METHOD FOR FABRICATING MAGNETIC WRITE POLE FOR A MAGNETIC HEAD USING AN E-BEAM RESIST MASK

(75) Inventors: Kim Y. Lee, Fremont, CA (US); Jyh-Shuey Lo, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 573 days.

(21) Appl. No.: 11/634,667

(22) Filed: Dec. 5, 2006

(65) Prior Publication Data
US 2008/0127481 A1 Jun. 5, 2008

(51) Int. Cl.
G11B 5/187 (2006.01)
B44C 1/22 (2006.01)
(52) U.S. Cl. ............... 29/603.12; 29/603.13; 29/603.15; 29/603.18; 360/122; 216/22; 216/42; 216/44; 216/66; 204/192.34
(58) Field of Classification Search .............. 29/603.09, 29/603.11, 603.12, 603.13, 603.14, 603.15, 29/603.16; 204/192.34; 216/22, 42, 44, 216/48, 63, 66; 360/125.08, 125.1, 125.51, 360/122
See application file for complete search history.

(56) References Cited

U.S. PATENT DOCUMENTS

| 4,141,733 | A | | 2/1979 | Guild |
| 4,401,745 | A | | 8/1983 | Nakane et al. |
| 4,663,268 | A | | 5/1987 | Turner et al. |
| 4,792,517 | A | | 12/1988 | Klein et al. |
| 4,902,605 | A | | 2/1990 | Klein et al. |
| 4,931,351 | A | * | 6/1990 | McColgin et al. .......... 216/48 X |
| 5,281,447 | A | | 1/1994 | Brady et al. |
| 5,438,747 | A | * | 8/1995 | Krounbi et al. ..... 204/192.34 X |
| 6,178,065 | B1 | * | 1/2001 | Terunuma et al. ... 360/125.51 X |
| 6,312,865 | B1 | | 11/2001 | Jung et al. |
| 6,632,903 | B2 | | 10/2003 | Jung et al. |
| 6,935,923 | B2 | * | 8/2005 | Burbank et al. ....... 29/603.09 X |
| 2003/0015494 | A1 | * | 1/2003 | Jayashankar et al. .......... 216/63 |

FOREIGN PATENT DOCUMENTS

JP 10340426 A * 12/1998

* cited by examiner

Primary Examiner—A. Dexter Tugbang
(74) Attorney, Agent, or Firm—Zilka-Kotab, PC

(57) ABSTRACT

A method is disclosed for independently controlling track width and bevel angle of a write pole tip of a magnetic recording head. The method includes establishing the track width in the pole tip layer material utilizing E-beam lithography. A portion of this pole tip material having the established track width is protected by providing a temporary masking material to make a protected portion. At least one unprotected portion is left exposed to be shaped. This unprotected portion is then beveled to produce at least one beveled portion. The protected portion produces an upper pole tip portion which together with the beveled portion produce an improved pole tip. Also disclosed is a magnetic head having the improved pole tip, and a disk drive having a magnetic head having the improved pole tip.

12 Claims, 8 Drawing Sheets

METHOD FOR FABRICATING MAGNETIC WRITE POLE FOR A MAGNETIC HEAD USING AN E-BEAM RESIST MASK

BACKGROUND OF THE INVENTION

1. Field of the Invention

The present invention relates generally to the manufacture of magnetic heads for data storage devices and more specifically to the fabrication of a narrow track width write pole tip for a magnetic head for a hard disk drive.

2. Description of the Prior Art

Data is conventionally written by a magnetic head and stored in a thin magnetic media layer of a hard drive disk. A typical magnetic recording head includes a trailing magnetic write pole, a leading return or opposing magnetic pole that is magnetically coupled to the write pole, and an electrically conductive induction coil disposed proximate the write pole and opposing pole. Current is passed through the induction coil to create magnetic flux within the write pole. The magnetic flux passes from the write pole tip, through the magnetic recording layer, and across to the opposing pole. Magnetization transitions on the magnetic layer of the recording disk are recorded by a trailing edge of the write pole tip and reproduce the shape of the pole tip projection on the media plane. Thus the size and shape of the pole tip is of significant importance in determining the density of data that can be stored on the disk.

Increases in areal density have correspondingly required devising fabrication methods to substantially reduce the width of the write pole tip while maintaining track-width control (TWC) and preserving trailing edge structural definition (TED). As mentioned above, the writing process reproduces the shape of the write pole tip projection on the media, so the size of the pole tip limits the size of the data bits and thus the areal data storage density, and pole tips having widths of less than 200 nm are currently being manufactured. Making reliable components of such microscopic size has been a challenge to the fabricating process arts. This problem is made even more challenging because the pole tip shape at the air bearing surface (ABS) of the magnetic head is preferably not a simple rectangle, but is trapezoidal, with parallel top and bottom edges, and with a bevel angle preferably of approximately 5 to 15 degrees on the side edges. This is primarily done so that the pole tip fits into the curved concentric data tracks on the media without unwanted extension of the pole tip corners extending into an adjacent track, as is understood by those skilled in the art.

Currently, photolithographic techniques are utilized to establish the track width of the write pole tip. Such photolithographic techniques are quite complicated, involving two or three layers of photoresist materials and masks to achieve acceptable results. Additionally, as the desired track width of the write pole tip is decreased in order to achieve higher areal data storage densities, the accuracy of such photolithographic techniques is reaching the limits of optical systems.

Thus there is a need for a method of magnetic pole fabrication in which a narrow pole tip track width is accurately fabricated, and where the bevel angle and track width produced are controlled as independent variables.

SUMMARY OF THE INVENTION

The present invention is a method for accurately fabricating the pole tip track width while independently controlling track width and bevel angle of the pole tip. The method includes accurately establishing the track width in a portion of the pole tip material using an epoxy resist such as KMPR with E-beam exposure fabrication techniques. This pole tip portion having the established track width is then protected with a temporary masking material, while an unprotected pole tip portion is left exposed to be shaped. The unprotected portion is then milled to produce beveled side walls, while the protected portion includes the narrow track width trailing edge. Also disclosed is a magnetic head having a pole tip of the present invention, and a disk drive having the magnetic head.

It is an advantage of the method for fabricating a magnetic head of the present invention that the track width of the write head pole tip can be accurately fabricated.

It is another advantage of the method for fabricating a magnetic head of the present invention that track width of the write pole tip can be made smaller while retaining pole tip fabrication accuracy.

It is a further advantage of the method for fabricating a magnetic head of the present invention that fabrication is made easier, since it is not necessary to attempt to control bevel angle and track width at the same time.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
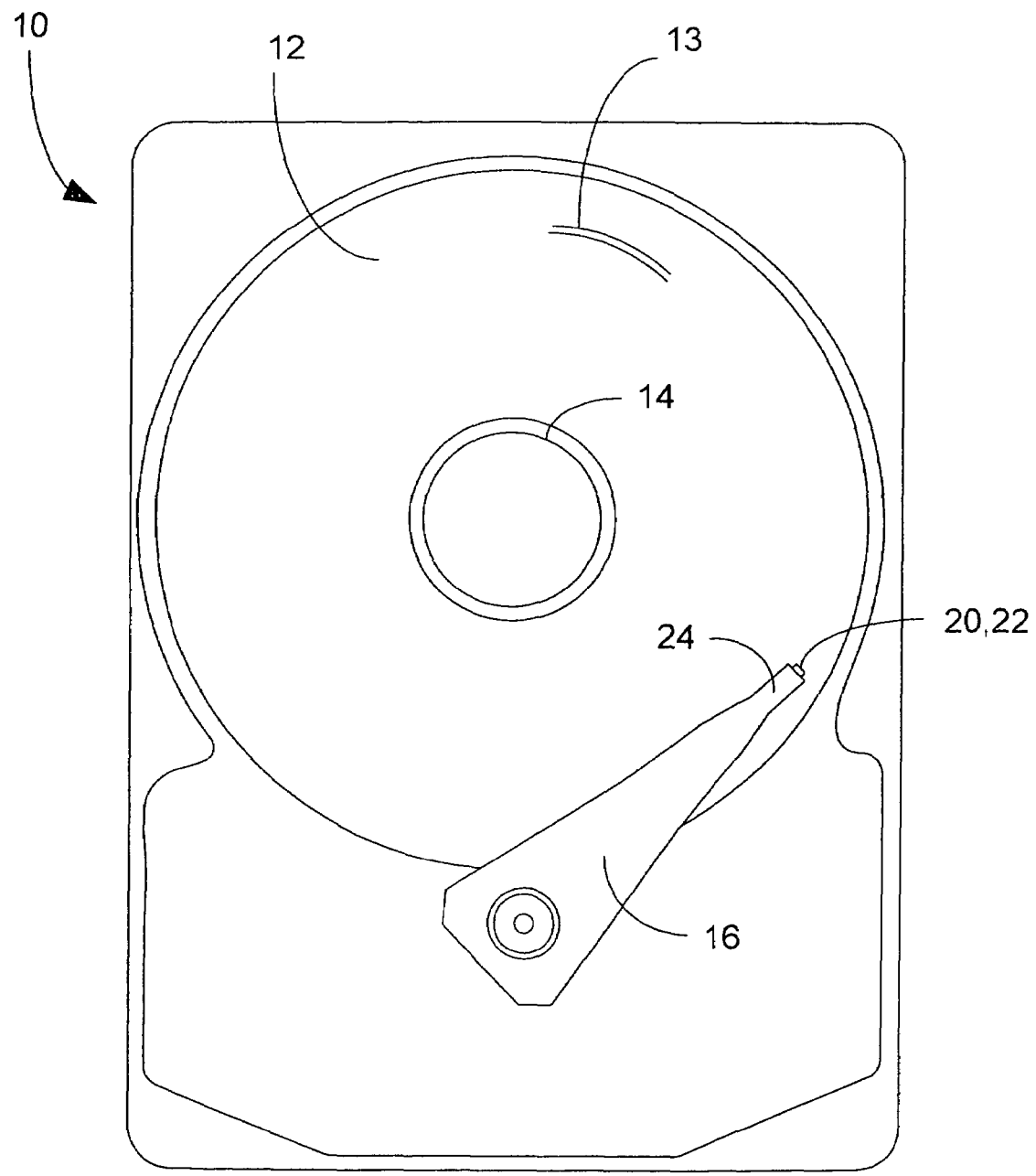
FIG. 1 is a top plan view of an exemplary disk drive having a magnetic head of the present invention.
Figure 2:
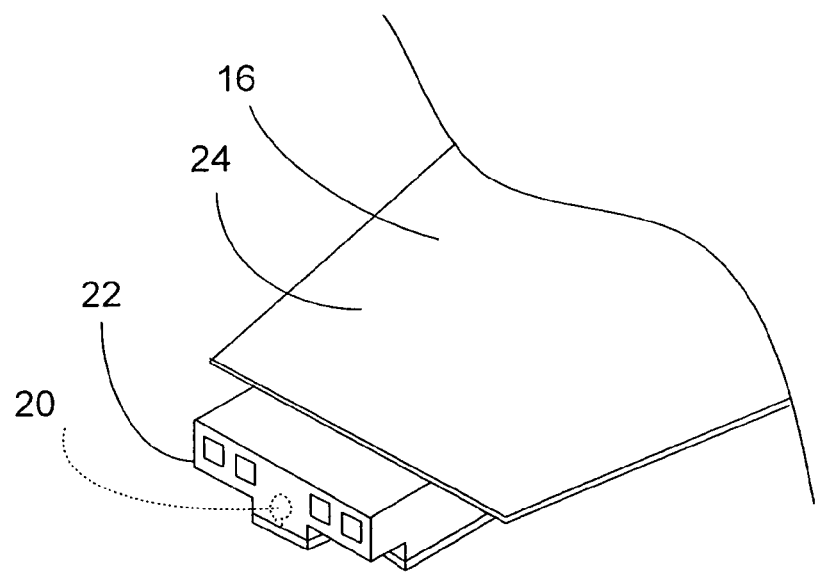
FIG. 2 is a perspective view of view of an exemplary slider and suspension.

FIG. 1 is a top plan view that depicts significant components of a hard disk drive which includes the magnetic head of the present invention. The hard disk drive 10 includes a magnetic media hard disk 12 having a plurality of data tracks 13 that is rotatably mounted upon a motorized spindle 14. An actuator arm 16 is pivotally mounted within the hard disk drive 10, and a magnetic head 20 of the present invention is fabricated upon a slider 22 that is disposed upon a distal end 24 of the actuator arm 16. A typical hard disk drive 10 may include a plurality of disks 12 that are rotatably mounted upon the spindle 14 and a plurality of actuator arms 16, each having one or more magnetic heads 20 mounted upon the distal end 24 of the actuator arm. As is well known to those skilled in the art, when the hard disk drive 10 is operated, the hard disk 12 rotates upon the spindle 14 and the slider 22 acts as an air bearing that is adapted for flying above the surface of the rotating disk. The slider 22 includes a substrate base upon which the various layers and structures that form the magnetic head are fabricated. Such heads are fabricated in large quantities upon a wafer substrate and subsequently sliced into discrete sliders 22 each having a magnetic head 20. FIG. 2 shows a slider 22 in greater detail being supported by an actuator arm 16. The magnetic head 20 is shown in dashed lines at the trailing edge of the slider 22, and in greater detail in FIGS. 3 and 4.

A magnetic head of the present invention may be either a perpendicular head or a longitudinal head, as those structures are known in the art; however, this detailed description will be focused on a perpendicular head configuration, where its application to a longitudinal head structure will be well understood by those skilled in the art.

Figure 3:
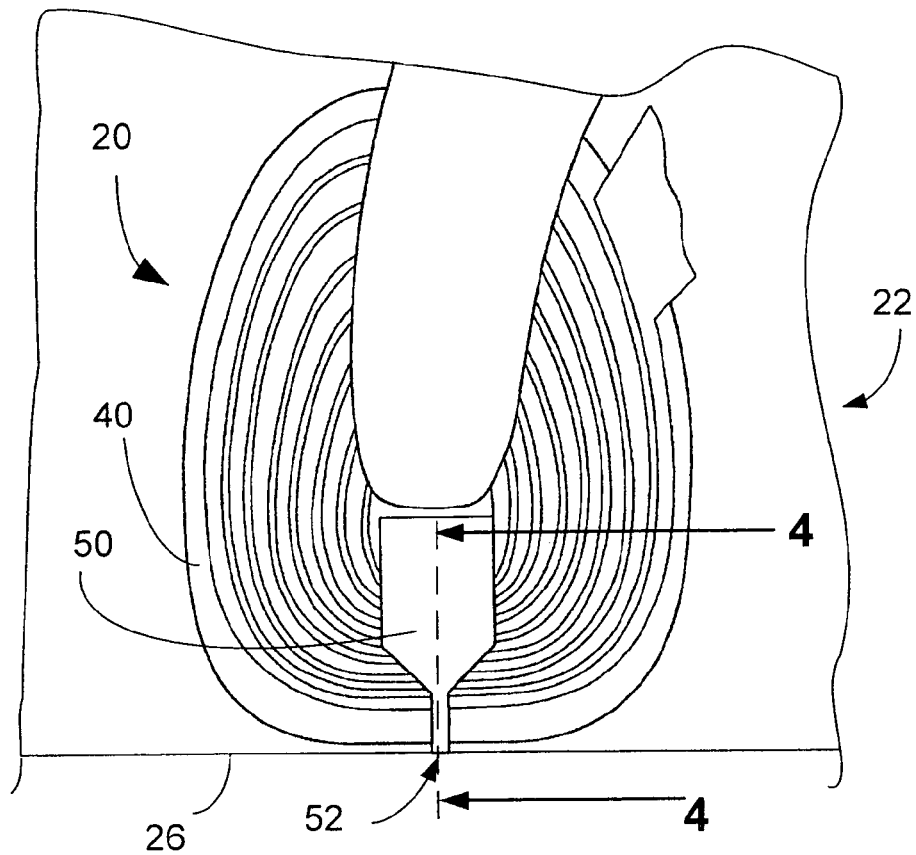
FIG. 3 shows a top plan view of an exemplary read/write head.
Figure 4:
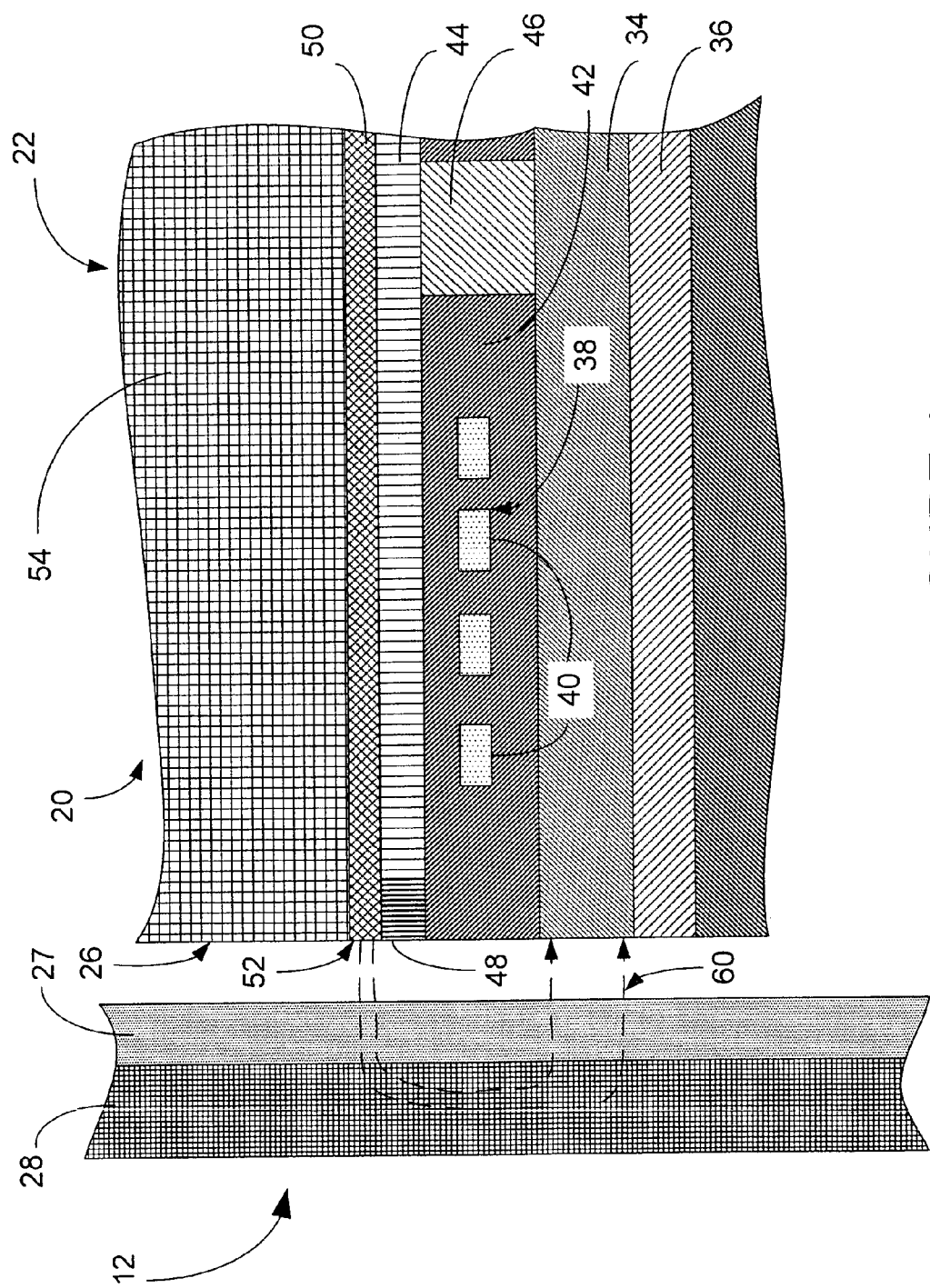
FIG. 4 is a cross-sectional view of an exemplary write head taken along lines 4-4 of FIG. 3.

A typical perpendicular magnetic head 20 is depicted in FIGS. 3 and 4, wherein FIG. 3 is a top plan view with cutaway portions and FIG. 4 is a side cross-sectional view of the write head portion of a representative perpendicular magnetic head 20. As is best seen in FIG. 4, the slider 22 has an air bearing surface (ABS) 26 which flies above the surface of a hard disk 12. The disk 12 includes a high coercivity magnetic layer, also referred to as the hard layer 27, that is fabricated on top of a magnetically soft layer 28.

The perpendicular head 20 typically includes a read head portion, which may have many differing structures as are known to those skilled in the art, and which is not shown here for simplicity. The write head portion of the head 20 includes a first magnetic pole 34 which is fabricated upon an insulation layer 36. An induction coil structure 38, which includes induction coil turns 40, is fabricated upon the first magnetic pole 34, where the coil turns 40 are typically formed within electrical insulation layers 42. A second magnetic pole layer, typically termed a shaping layer 44, is fabricated on top of the induction coil structure 38, and a magnetic back gap piece 46 joins the back portions of the first magnetic pole 34 and the shaping layer 44, such that magnetic flux can flow between them. The shaping layer 44 is fabricated so that a gap 48 is left between it and the air bearing surface (ABS) 26, and an alumina fill is deposited across the surface of the wafer which results in filling the gap 48 in front of the shaping layer 44. A second magnetic pole layer, also called a probe layer, which includes a second magnetic pole 50 with a second magnetic pole tip 52, is fabricated upon the shaping layer 44 in magnetic flux communication with the shaping layer 44. The shaping layer 44 channels and directs the magnetic flux into the second magnetic pole 50 and into the second magnetic pole tip 52.

The magnetic head 20 is subsequently encapsulated, such as with the deposition of an alumina layer 54. Thereafter, the wafer is sliced into rows of sliders with magnetic heads, and the ABS surface of the heads is carefully polished and lapped and the discrete magnetic heads are formed.

When the write head is operated, electrical current flowing through the induction coil structure 38 will cause magnetic flux 60 to flow through the magnetic poles 34, 50 of the head, where the direction of magnetic flux flow depends upon the direction of the electrical current through the induction coil. In one direction, current will cause magnetic flux 60 to flow through the shaping layer 44, through the second magnetic pole 50 to the narrow second magnetic pole tip 52, and into the hard layer 27 and soft layer 28 of the hard disk 12. This magnetic flux 60 causes magnetized data bits to be recorded in the high coercivity layer hard layer 27 where the magnetic field of the data bits is perpendicular to the surface of the disk 12. The magnetic flux then flows into the magnetically soft underlayer 28 and disperses as it loops back towards the first magnetic pole 34. The magnetic flux then flows through the back gap piece 46 to the shaping layer 44, thus completing a magnetic flux circuit. In such perpendicular write heads, it is significant that at the ABS 26, the first magnetic pole 34 is much larger than the second magnetic pole tip 52, so that the density of the magnetic flux passing out from the high coercivity magnetic hard layer 27 is greatly reduced as it returns to the first magnetic pole layer 34 and will not magnetically affect, or flip, the magnetic field of data bits on the hard disk, such as bits on data tracks adjacent to the track being written upon.

Figure 5:
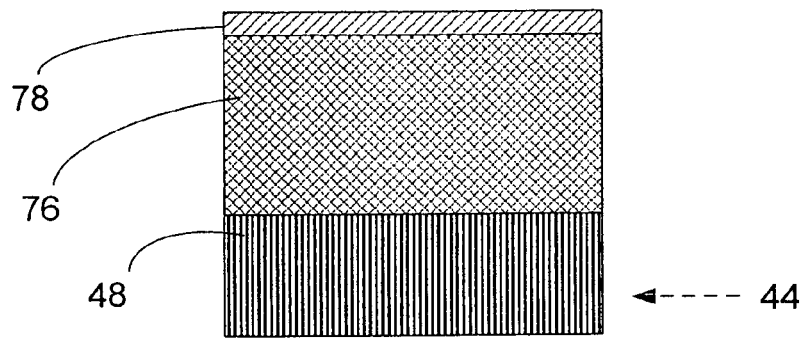
FIGS. 5-14 are views of various stages in the fabrication of the magnetic head pole tip of the magnetic head of the present invention.

FIGS. 5-14 show various stages of the fabrication of the second magnetic pole tip 52 structure of the present invention as seen from the ABS, and the following discussion refers to all of these drawings generally. As depicted in FIG. 5, following the fabrication of the shaping layer 44 (see FIG. 4), the alumina insulation layer 48 in front of the shaping layer is fabricated. A second magnetic pole layer 76, which may consist of laminated layers of high magnetic moment and non-magnetic laminated pole materials such as CoFe or CoFeN or NiFe and Cr, $Al_2O_3$, Ru, Rh, etc., respectively, is fabricated on top of the alumina insulation layer 48 and shaping layer 44 (disposed behind the insulation layer 48 in FIG. 5). On top of this, a thin non-magnetic film layer 78 of Ta/Rh, or C (such as diamond-like-carbon (DLC)) is deposited which acts as a cap layer.

Figure 6:
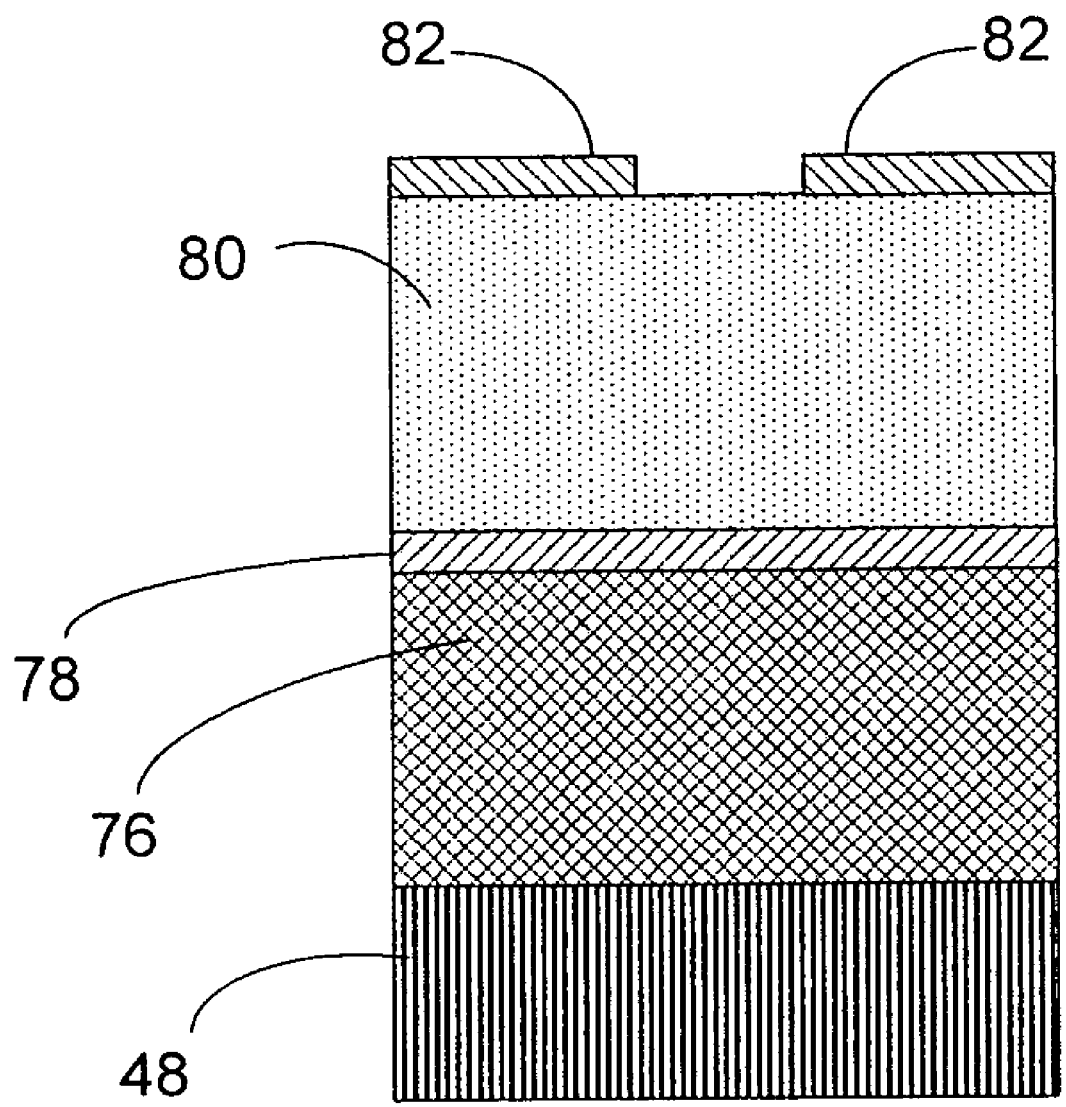

Thereafter, as depicted in FIG. 6, an E-beam resist layer 80 suitable for E-beam lithography is fabricated upon the cap layer 78. FIG. 6 depicts the width of the E-beam resist mask gap at the write pole tip location of the device. A typical E-beam resist is an epoxy based resist such as KMPR, which is an epoxy based alkaline developable negative resist, which is preferably deposited utilizing thin film spin deposition techniques. KMPR is an E-beam lithography resist marketed by MicroChem Corp., 1254 Chestnut Street, Newton, Mass.; KMPR is a registered trademark of MicroChem Corp. A desirable thickness of the E-beam 80 resist is from approximately 0.8 µm to approximately 2.0 µm, with a preferred thickness of approximately 1.5 µm. Thereafter, a negative resist E-beam mask 82 is fabricated upon the resist layer 80 to cover undesired resist portions and permit E-beam exposure to the unmasked desired portions of the E-beam resist in the desired shape of the second magnetic pole and particularly the second magnetic pole tip.

Figure 7:
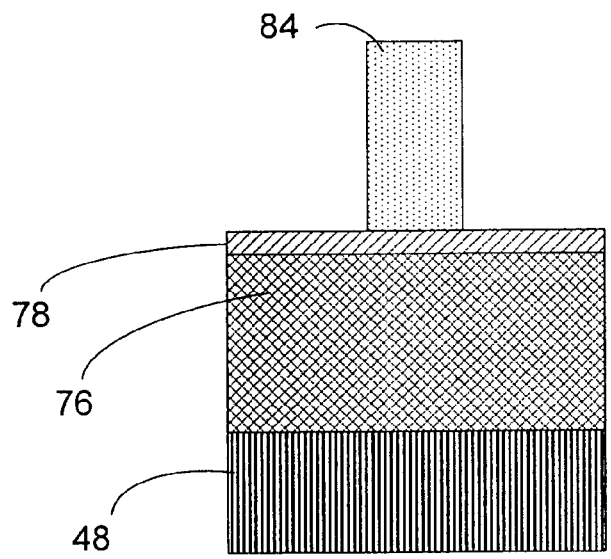

Thereafter, as depicted in FIG. 7, E-beam lithography is conducted, as is known to those skilled in the art, and following E-beam exposure, the E-beam mask and the masked portions of the KMPR layer are removed, such as with the use of an alkaline stripper, as is known for use in lithography utilizing the KMPR resist. As can be seen in FIG. 7, the remaining exposed KMPR resist is fabricated to cover the shape of the desired second magnetic pole and its write pole tip 52.

Figure 8:
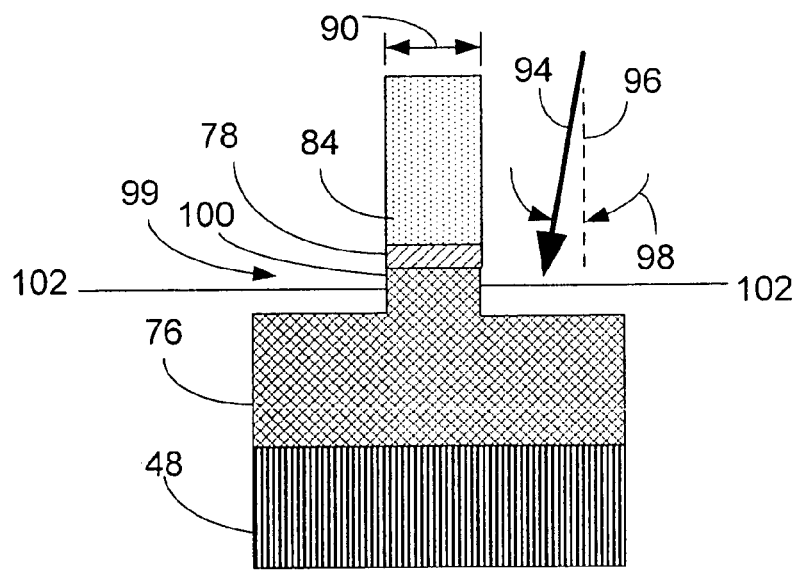

As depicted in FIG. 8, ion milling is used to establish the final track width 90 of the write pole tip 52, as indicted by the ion milling beam direction arrow 94. Ion milling is a very directional milling process and this milling operation is done at a range of angles 98, preferably in the range of 0-15 degrees from normal incidence to the wafer surface as indicated by the arrow 96. The KMPR milling mask layer 84 protects a central portion 99 of the second magnetic pole material 76 and cap layer 78, while the ion milling removes material from the unmasked portion of the pole material 76, forming a write pole tip protrusion 100 of second magnetic pole material which will become the upper portion of the final second magnetic pole tip, as is discussed below. The write pole tip protrusion 100 includes sidewalls 102 that are generally perpendicular to the wafer surface.

Figure 9:
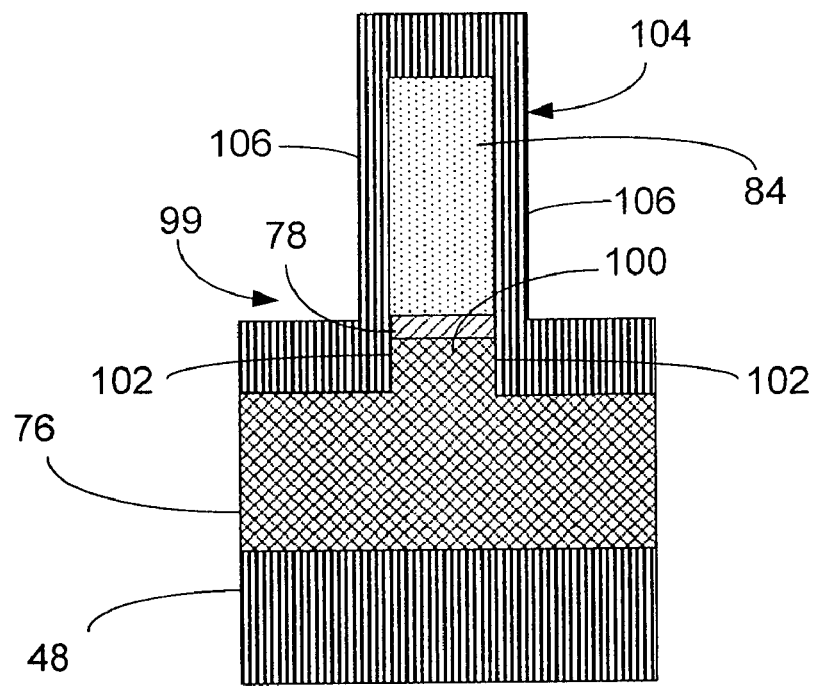

Thereafter, as depicted in FIG. 9, a thin layer of alumina 104 is deposited over the entire structure as it exists at this stage, including the second magnetic pole material 76, cap layer 78 and mask 84. The alumina 104 is preferably deposited utilizing atomic layer deposition (ALD) techniques, although other deposition techniques such as sputter deposition may be used. It is important that the side walls 102 of the write pole tip protrusion 100 are covered by initial wall portions 106 of the thin alumina layer. The initial wall portions 106 are formed with a thickness of from approximately 50 μm to approximately 200 μm.

Figure 10:
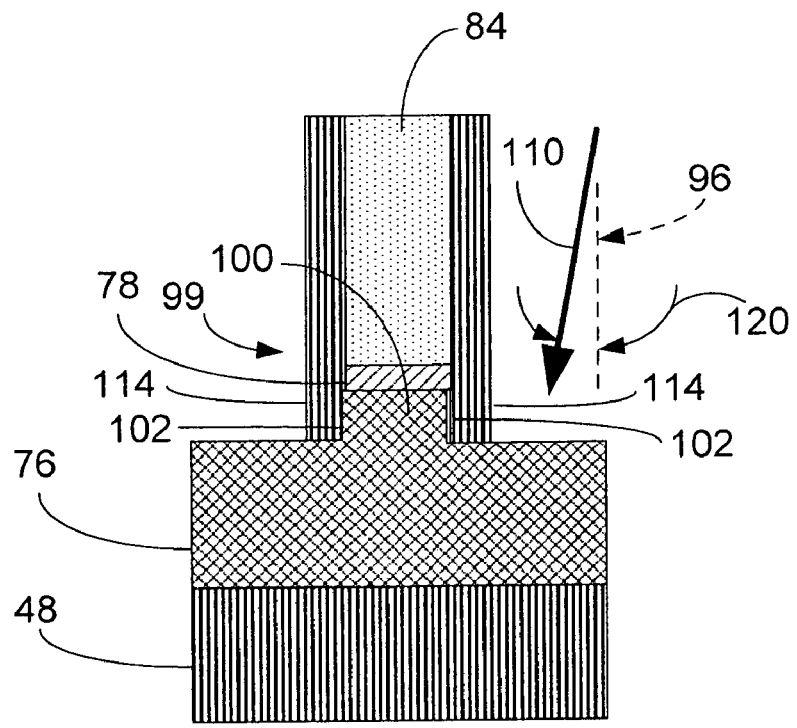

Next, as seen in FIG. 10, reactive ion milling (RIM) is next conducted as indicated by the arrow 110 to remove the alumina layer from the top of the mask 84 and second magnetic pole material 76. RIM with fluorine reactive species is preferably used because the alumina has a selectively fast fluorine reactive ion milling rate, compared to the mask material and second magnetic pole material. The RIM process is also very directional, leaving remaining alumina wall portions 114 that act as temporary wall masks, while the alumina on more horizontal surfaces is milled away. This reactive ion milling operation is conducted at an angle 120, preferably in the range of 0-15 degrees from normal incidence to the wafer surface as indicated by the arrow 96.

Figure 11:
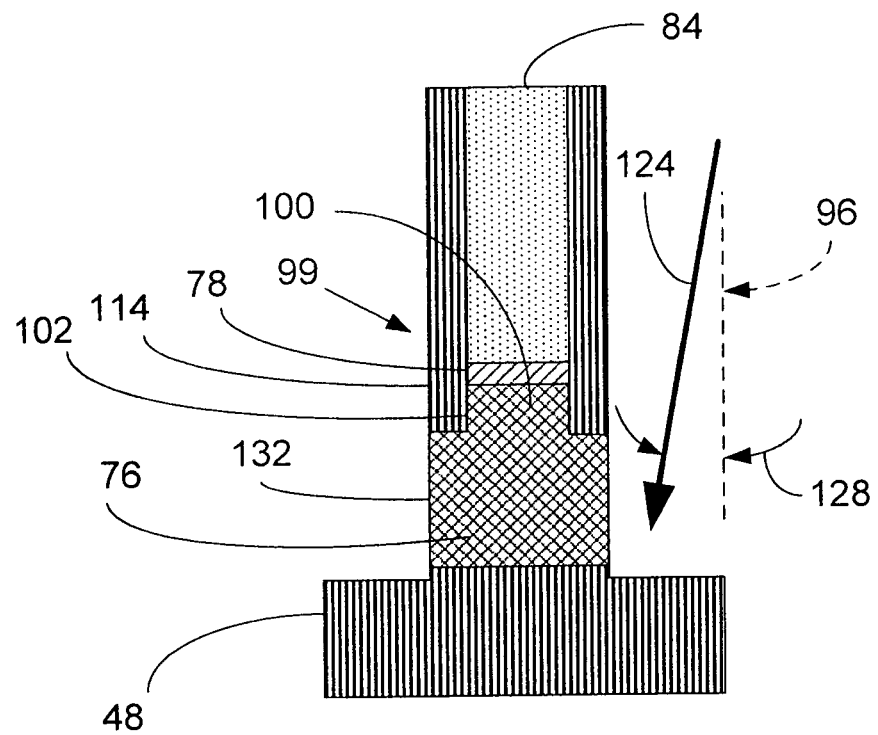
Figure 12:
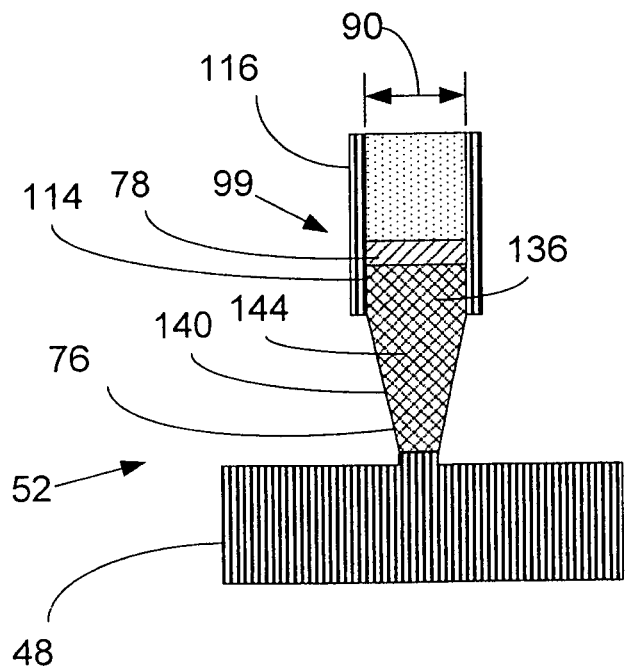

FIG. 11 shows the next stage in which standard ion milling using a gas such as argon is conducted at an angle 128 preferably in the range of 40-80 degrees from normal incidence 96 to the wafer surface. This is done to mill the sides of the second magnetic pole 76 away, down to and slightly into the alumina insulation layer 48. As alumina has a slower milling rate under standard ion milling compared to the second magnetic pole material, the temporary wall masks act to preserve the second magnetic pole tip material 100 located directly behind them. Thus the remaining alumina wall portions 114 act as temporary wall masks to shield protected second magnetic pole tip portions 99 including the cap layer 78, leaving the unprotected second magnetic pole material wall portions 132 to be shaped and beveled by the ion milling beam. As depicted in FIG. 12, following this ion milling step the protected second magnetic pole tip portions 99 will thus produce the upper portion 136 of the second magnetic pole tip 52, while the wall sides are beveled to the appropriate angle of approximately 5-15 degrees to make beveled walls 140 of a beveled portion 144 of the second magnetic pole tip 52. Thus the second magnetic pole tip 52 is produced with the track width 90 preserved in the upper portion 136.

Figure 13:
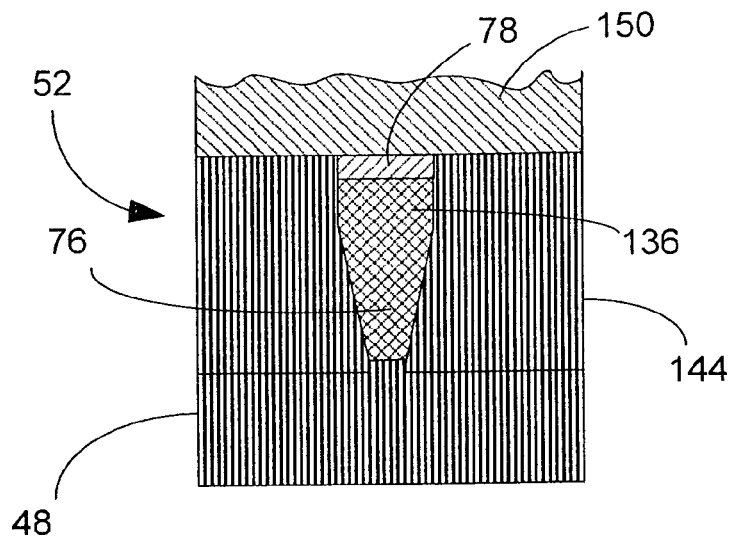

As depicted in FIG. 13, a layer of alumina 144 is next deposited to fill and cover the second magnetic pole material and mask 84. Chemical Mechanical Polishing (CMP) is then performed to remove the excess surface alumina and mask 84. The cap layer 78 acts as a stop layer for the CMP. Further alumina fill 150 is thereafter deposited to encapsulate the second magnetic pole tip 52 and complete the fabrication of the second magnetic pole 50.

Figure 14:
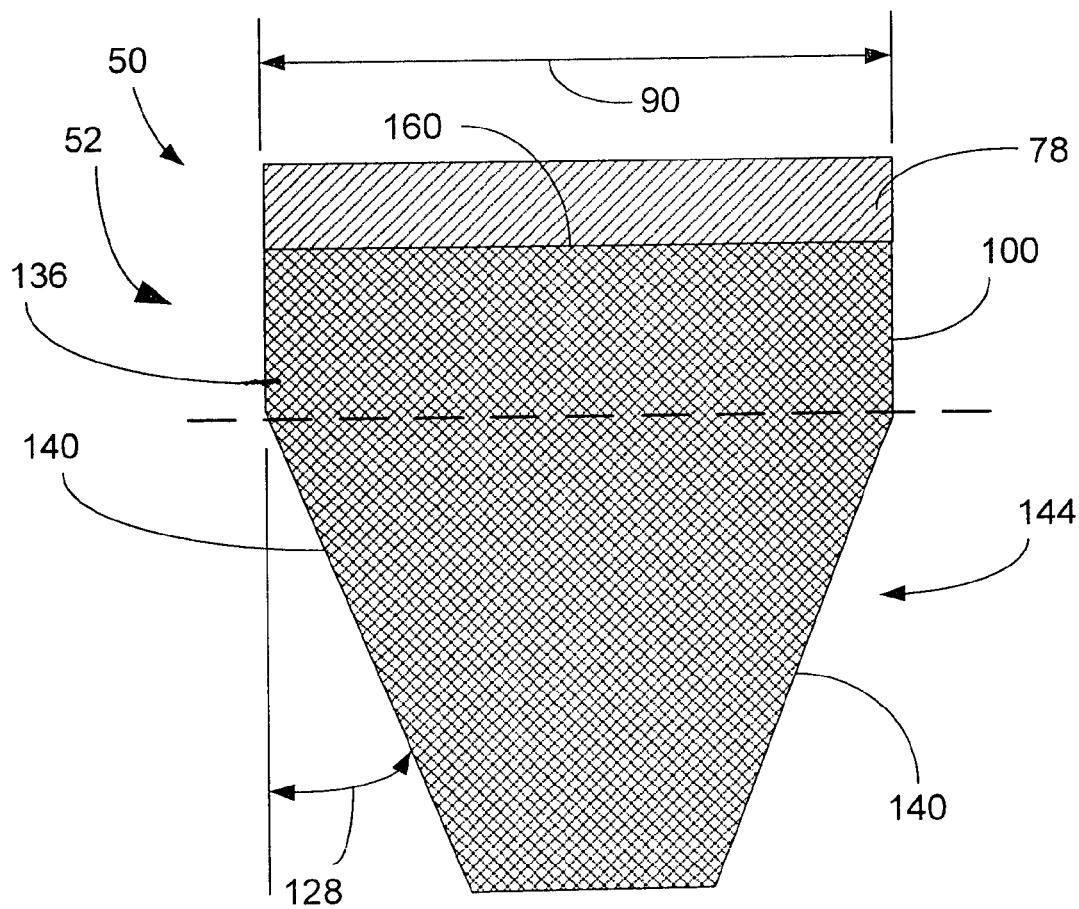

FIG. 14 shows a detail view of the completed second magnetic pole tip 52 of a second magnetic pole 50 of the present invention. A dashed line is used to identify the protected upper portion 100, which becomes the upper portion 136 of the pole tip 52, from the unprotected portion which becomes the beveled portion 144 having beveled walls 140. The remaining cap layer 78 is also shown. No attempt has been made to make the relative proportions of the portions exactly to scale, and it is to be understood that there is much variation possible in the relative sizes of areas, as well as in the bevel angle and the track width.

As discussed above, the method of the present invention using KMPR resist and E-beam resist track width formation techniques allows for the accurate fabrication of a very narrow second magnetic pole tip track width 90 at the trailing edge 160 of the upper portion 136, and provides independent control of these crucial variables of bevel angle and the track width. The use of E-beam lithography in forming the write pole tip simplifies the magnetic head fabrication process as compared to the pre-existing process in which a plurality of layers of photoresist materials and mask materials must be deposited and fabricated prior to the milling of the write pole tip. Additionally, E-beam lithography facilitates the creation of a narrower write pole tip mask, which facilitates the fabrication of a narrower write pole tip, as is desired for increasing the areal data storage density of magnetic media and hard disk drives in which the write pole tips of the magnetic heads of the present invention are utilized.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for fabricating a magnetic recording head, comprising:
   A) depositing an insulation layer above a wafer surface;
   B) depositing a magnetic pole layer above portions of said insulation layer;
   C) depositing a cap layer above said magnetic pole layer;
   D) fabricating a resist layer above said cap layer, said resist layer being composed of a resist material that is adapted for E-beam lithography;
   E) removing portions of said resist layer such that a pole tip mask composed of said resist remains disposed above portions of said magnetic pole layer;
   F) milling said magnetic pole layer and said cap layer to form a write pole tip protrusion having write pole tip protrusion wall portions;
   G) depositing an alumina layer over said write pole tip protrusion to create initial alumina wall portions of said alumina layer that are disposed upon said write pole tip protrusion wall portions;
   H) milling said alumina layer to produce protected portions of said write pole tip having remaining alumina wall portions that are disposed over said write pole tip protrusion wall portions and unprotected portions of said magnetic pole layer; and
   I) milling said unprotected portions of said magnetic pole layer to form an upper portion and a beveled portion of said write pole tip, wherein sidewalls of the beveled portion taper towards one another as the sidewalls approach the insulation layer.

2. A method for fabricating a magnetic head as described in claim 1 wherein said write pole tip protrusion wall portions are generally perpendicular to said wafer surface.

3. A method for fabricating a magnetic head as described in claim 2 wherein said beveled portion of said write pole tip includes sidewalls that are beveled to an angle of from approximately 5° to approximately 15° from normal incidence to the wafer surface.

4. A method for fabricating a magnetic head as described in claim 1 wherein an E-beam mask is fabricated upon said resist layer.

5. A method for fabricating a magnetic head as described in claim 1 wherein said resist layer is comprised of an epoxy resist.

6. A method for fabricating a magnetic head as described in claim 5 wherein said resist layer is fabricated with a thickness of from approximately 0.8 μm to approximately 2.0 μm.

7. A method for fabricating a magnetic head as described in claim 1 wherein said initial wall portions of said alumina layer are fabricated with a thickness of from approximately 50 μm to approximately 200 μm.

8. A method for fabricating a magnetic head as described in claim 1 wherein said alumina layer is deposited utilizing atomic layer deposition techniques.

9. A method for fabricating a magnetic head as described in claim 1 wherein said milling of said magnetic pole layer is conducted utilizing directional ion milling at angles within the range of 0° to 15° from normal incidence to the wafer surface.

10. A method for fabricating a magnetic head as described in claim 1 wherein said milling of said alumina layer is conducted utilizing directional reactive ion milling at angles within the range of from 0° to 15° from normal incidence to the wafer surface.

11. A method for fabricating a magnetic head as described in claim 1 wherein said milling of said unprotected portions of said magnetic pole layer is conducted at angles within a range of from approximately 40° to approximately 80° from normal to the wafer surface.

12. A method for fabricating a magnetic head as described in claim 1 wherein said beveled portion of said write pole tip includes sidewalls that are beveled to an angle of from approximately 500 to approximately 150 from normal incidence to the wafer surface.

* * * * *